United States Patent

Lin et al.

[19]

[11] Patent Number: 6,024,336
[45] Date of Patent: Feb. 15, 2000

[54] MONITOR BASE

[75] Inventors: Wen-Pen Lin, I Lan Hsien; Chi-Jung Wu, Taoyuan, both of Taiwan

[73] Assignee: Acer Peripherals, Inc., Taiwan, Taiwan

[21] Appl. No.: 09/111,797

[22] Filed: Jul. 8, 1998

[51] Int. Cl.⁷ .................................................. A47G 29/00
[52] U.S. Cl. ........................................... 248/371; 248/923
[58] Field of Search .................................... 248/371, 133, 248/139, 919, 917, 920, 921, 922, 923, 393, 395, 396, 397, 394

[56] References Cited

U.S. PATENT DOCUMENTS

| | | | |
|---|---|---|---|
| 4,365,779 | 12/1982 | Bates et al. ............................... | 248/371 |
| 5,037,050 | 8/1991 | Lin et al. ............................... | 248/921 X |
| 5,588,625 | 12/1996 | Beak ........................................ | 248/371 |
| 5,632,463 | 5/1997 | Sung et al. ............................... | 248/371 |
| 5,755,420 | 5/1998 | Wu et al. .................................. | 248/371 |
| 5,881,985 | 3/1999 | Hoenig ..................................... | 248/371 |

*Primary Examiner*—Ramon O. Ramirez
*Attorney, Agent, or Firm*—Pillsbury Madison & Sutro LLP

[57] ABSTRACT

A monitor base comprising a standing member and a movable member is disclosed. The standing member has a coupling member, while the movable member has an opening through which the coupling member is movably connected to the movable member, and a guard member provided in the opening to prevent the coupling member and the movable member from separating. The movable member is moved relative to the standing member with the coupling member constrained by the opening.

13 Claims, 7 Drawing Sheets

MONITOR BASE

BACKGROUND OF THE INVENTION

1. Field of the Invention

The present invention relates in general to a monitor base of simple structure and low manufacturing cost.

2. Description of the Related Art

A conventional monitor base has three main parts and a screw to assemble the three parts. The number of parts increases the production cost and creates a storage problem. Therefore, it is advantageous to decrease the number of parts constituting a monitor base.

To solve the above-mentioned problems, Taiwanese Patent No. 296886 discloses a monitor base which has only two parts a stand and a rotating disk. However, the structure of each part of such a monitor base is more complicated. For example, the stand of the monitor base additionally comprises a coupling member, a resilient piece, a groove and a stopping block. Furthermore, the rotating disk of the monitor base additionally comprises a coupling opening. Manufacturing a monitor base having components with complicated structures requires a more elaborate and expensive process.

Another monitor base is disclosed in BACKGROUND OF THE INVENTION of U.S. Pat. No. 5,588,625, in which the monitor base comprises an upper stand portion and a stand base portion as shown in FIG. 7 of the present application. The stand base portion 11 is provided with a fixing bar 112 and a direction-controlling aperture 111, while the upper stand portion 12 is provided with a guide slot 123 and a pin 121. The fixing bar 112 is inserted into the guide slot 123 and simultaneously the pin 121 is inserted into the direction-controlling aperture 111 to securely fix the upper stand portion 12 onto the stand base portion 11. To disassemble the monitor base, the upper stand portion 12 is detached from the stand base portion 11 by pulling upwardly a boss 122 connected to the pin 121. Then, the pin 121 is removed from the direction-controlling aperture 111. The structure of the monitor base is complicated.

The two-part monitor bases mentioned above have a common problem-complicated structure. Therefore, amending the design of the monitor base becomes important in order to decrease the manufacturing cost.

SUMMARY OF THE INVENTION

An object of the present invention is to provide a monitor base of simple structure that has two parts.

In accordance with the object of the present invention, a monitor base is provided that comprises a standing member and a movable member. The standing member has a coupling member, while the movable member has an opening through which the coupling member is movably connected to the movable member, and a guard member provided in the opening to prevent the coupling member and the movable member from separating. The movable member is moved relative to the standing member with the coupling member constrained by the opening.

In the present invention, the standing member has a coupling member while the movable member has an opening through which the coupling member is connected to the standing member. Also, assembling and disassembling the monitor base is controlled by a guard member provided in the opening. The design of the present invention is simple and the cost for manufacturing the monitor base is low, thereby enhancing its commercial competitiveness.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
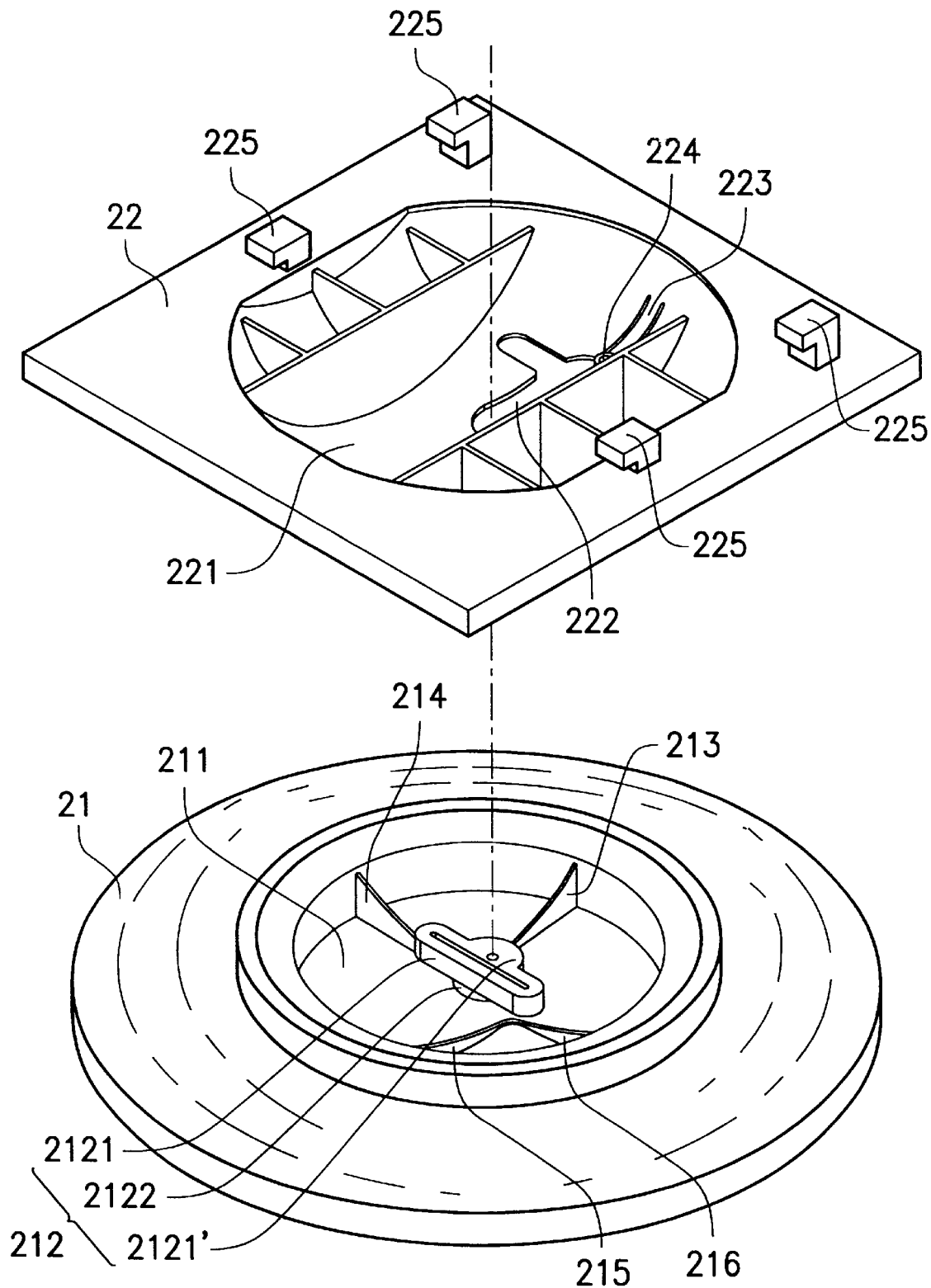
FIG. 1 is a perspective exploded view of a monitor base s according to a first embodiment of the present invention.
Figure 2:
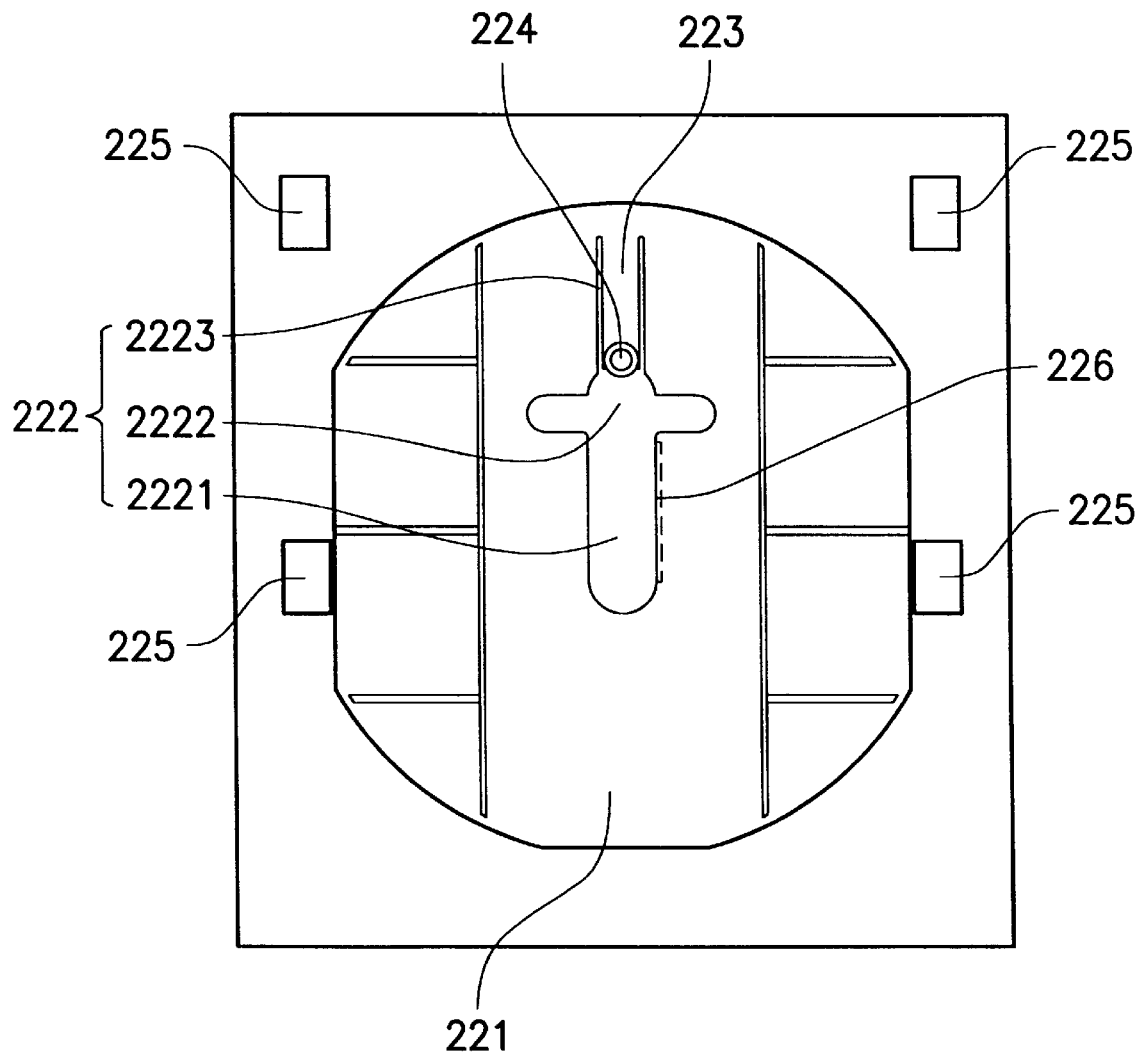
FIG. 2 is a top view of a movable member of the monitor base according to FIG. 1.
Figure 3:
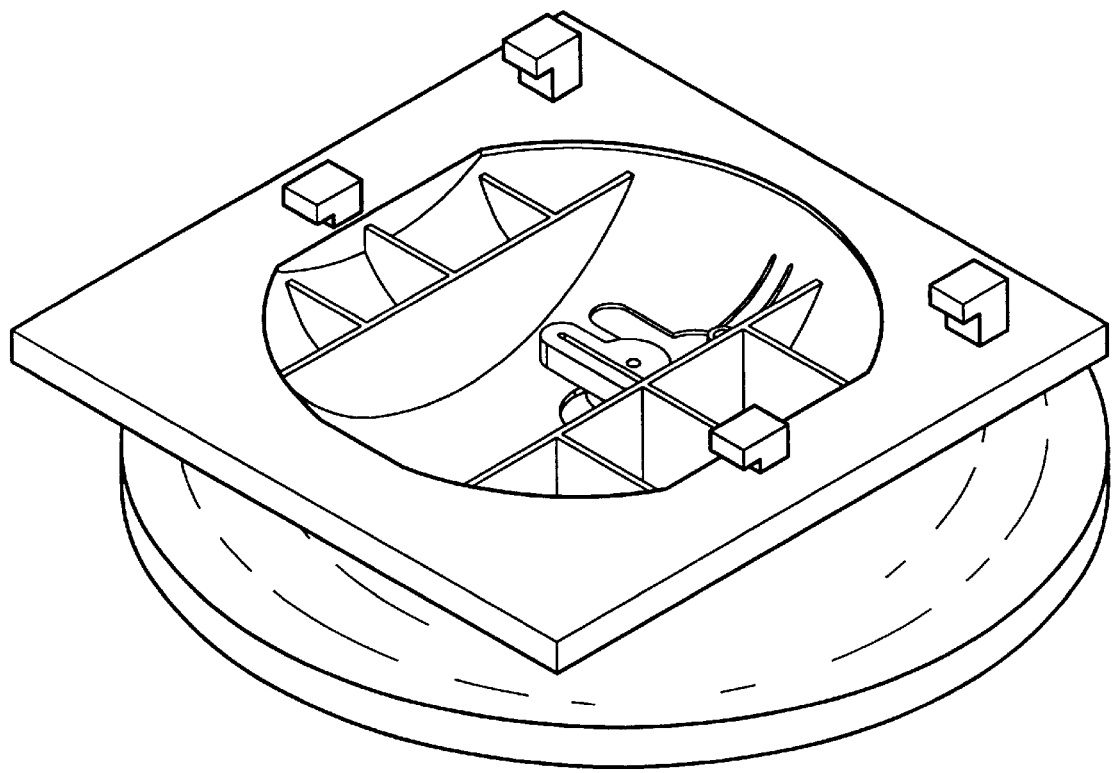
FIG. 3 is a perspective view of the monitor base according to FIG. 1.

FIGS. 1–3 show a first embodiment of the present invention. Referring to FIG. 1, a monitor base of the present invention includes a standing member 21 and a movable member 22. The movable member 22 is movably mounted on the standing member 21, while a monitor (not shown) is securely fixed on the movable member 22. The user can adjust the angle or position of the monitor by moving the movable member 22 with respect to the standing member 21.

The movable member 22 has a concave portion 221 around which a plurality of hooks 225 are provided to secure the monitor and the movable member 22 together. Also, an opening 222 is provided in the concave portion 221. As shown in FIG. 2, the opening 222 comprises a sliding zone 2221, a mounting zone 2222 and a resilient piece zone 2223, all of which are slot-shaped. Moreover, the mounting zone 2222 is longitudinally perpendicular to the sliding zone 2221 and resilient piece zone 2223, so that the opening 222 is shaped like a cross. A cantilever resilient piece 223 extends in the resilient piece zone 2223. A guard member 224 is connected to the free end of the cantilever resilient piece 223, and occupies a part of the mounting zone 2222. Furthermore, a rib 226 is disposed on the bottom of the movable member 22 at an edge of the sliding zone 2221, as indicated by the broken line in FIG. 2.

Referring back to FIG. 1, the standing member 21 has a cavity 211 in which a coupling member 212 and four ribs 213, 214, 215, 216 are provided. The ribs 213, 214, 215, 216 radiate from the coupling member 212. The coupling member 212 comprises a support column 2122 and an end portion 2121 supported by the support column 2122. The end portion 2121 is substantially L-shaped and has a protrusion 2121' protruding from its side. It is noted that the shape of the end portion 2121 matches that of the mounting zone 2222 of the opening 222.

When assembling the monitor base, the mounting zone 2222 of the opening 222 is disposed over the coupling member 212. Then, the movable member 22 can be mounted on the standing member 21 by pressing down. In detail, the end portion 2121 of the coupling member 212 is forced to pass through the mounting zone 2222 of the opening 222 by pressing the movable member 22. The guard member 224, occupying the mounting zone 2222, is pushed away by the protrusion 2121' of the end portion 2121 when the end portion 2121 of the coupling member 212 passes through the mounting zone 2222. Then, the support column 2122 of the coupling member 212 enters the mounting zone 2222. Then, the protrusion 2121' of the end portion 2121 is pushed by the restoring force of the cantilever resilient piece 223 so that the coupling member 212 moves toward the sliding zone 2221. Then, the support column 2122 of the coupling member 212, originally in the mounting zone 2222, is moved to the sliding zone 2221. As shown in FIG. 3, the guard member 224 can prevent the coupling member 212 from returning to the mounting zone 2222 after the coupling member enters the sliding zone 2221. In design, the diameter of the support column 2122 must be less than the width of the sliding zone 2221 so that the support column 2122 can enter the sliding zone 2221. Furthermore, the length of the end portion 2121 of the coupling member 212 must be greater than the width of the sliding zone 2221 so that the coupling member 212 cannot escape from the sliding zone 2221 of the opening 222.

The angle or position of the monitor, which is provided with the monitor base of the present invention, can be adjusted. In operation, the movable member 22 provided with the opening 222 is allowed to move with respect to the standing member 21 provided with the coupling member 212. The opening 222 of the movable member 22 can slide relative to the coupling member 212 of the standing member 21, and the sliding zone 2221 of the opening 222 itself is the space provided for sliding. This corresponds to the upward or downward rotation of the monitor. Furthermore, the opening 222 of the movable member 22 can be rotated relative to the coupling member 212 of the standing member 21, and the rib 226 of the movable member 22 is constrained by the ribs 213, 214, 215, 216 of the standing member 21 during rotation. This corresponds to the rotation of the monitor toward the left or the right (at most 45°).

Dismounting the monitor base of the present invention is now discussed. The guard member 224 of the movable member 22 can be pried away from the mounting zone 2222 of the opening 222 by, for example, a screwdriver. Then, the coupling member 212 can escape from the mounting zone 2222. The standing member 21 and the movable member 22 thus separate.

Figure 4:
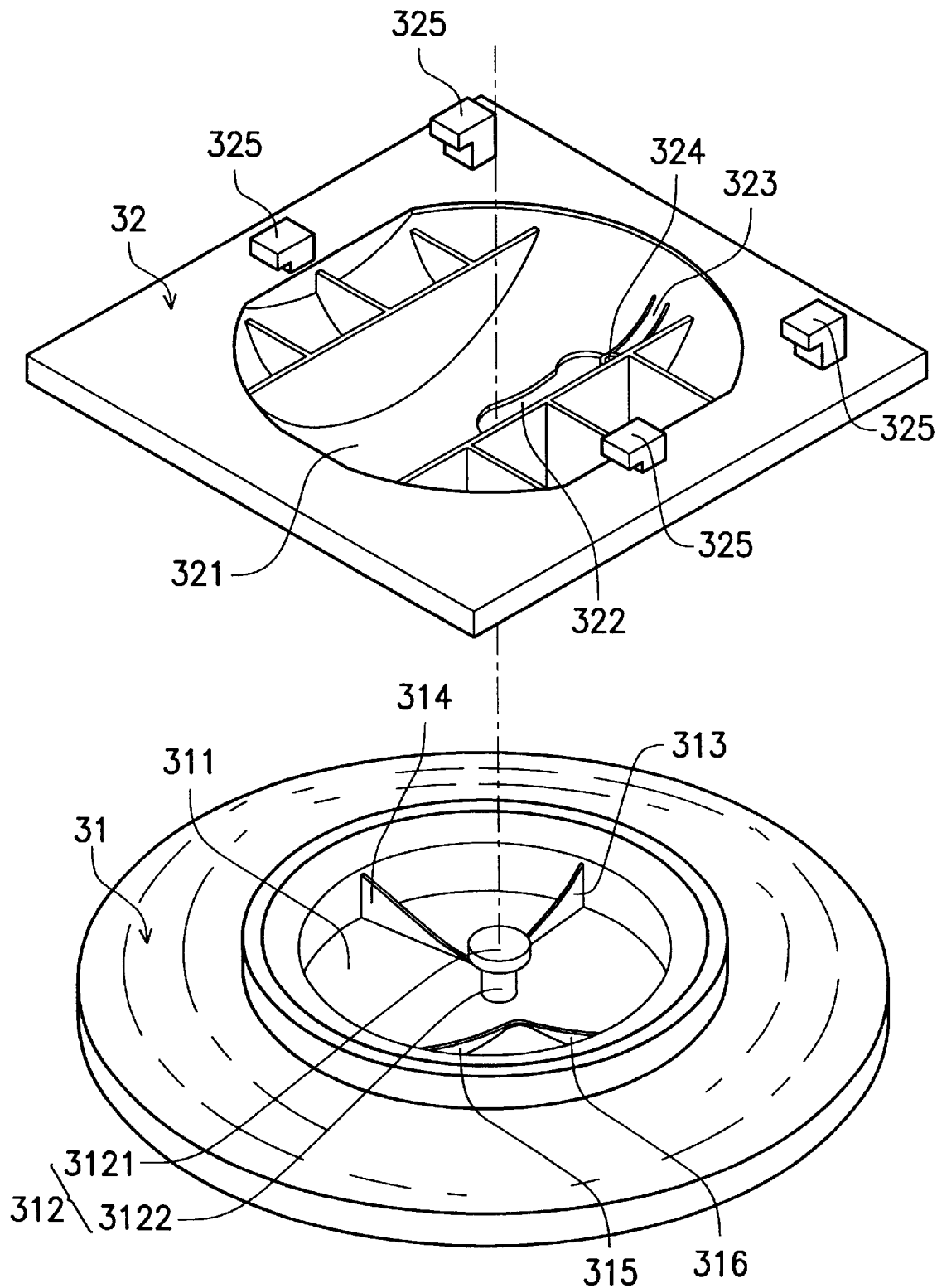
FIG. 4 is a perspective exploded view of a monitor base according to a second embodiment of the present invention.
Figure 5:
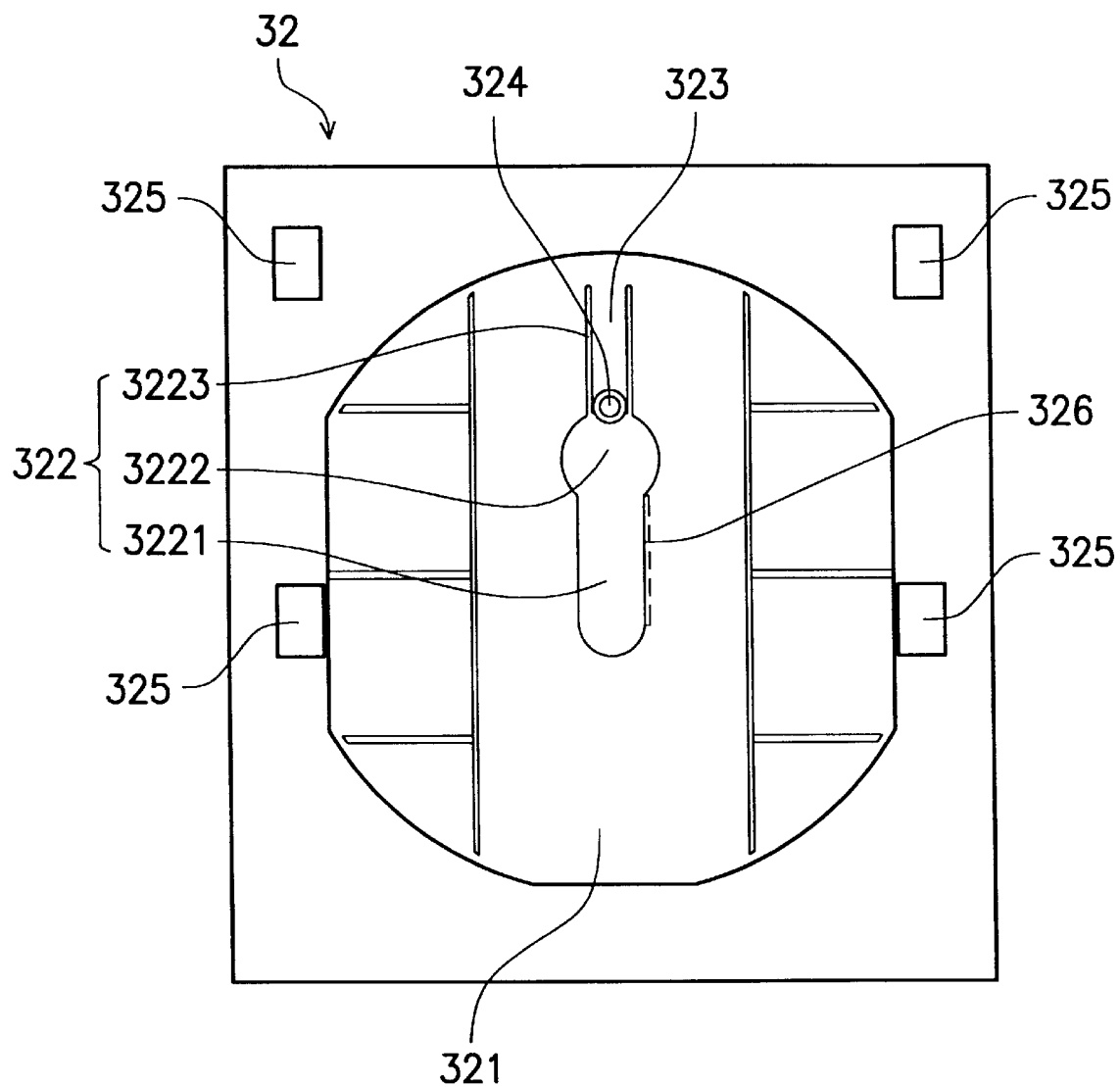
FIG. 5 is a top view of a movable member of the monitor base according to FIG. 4.
Figure 6:
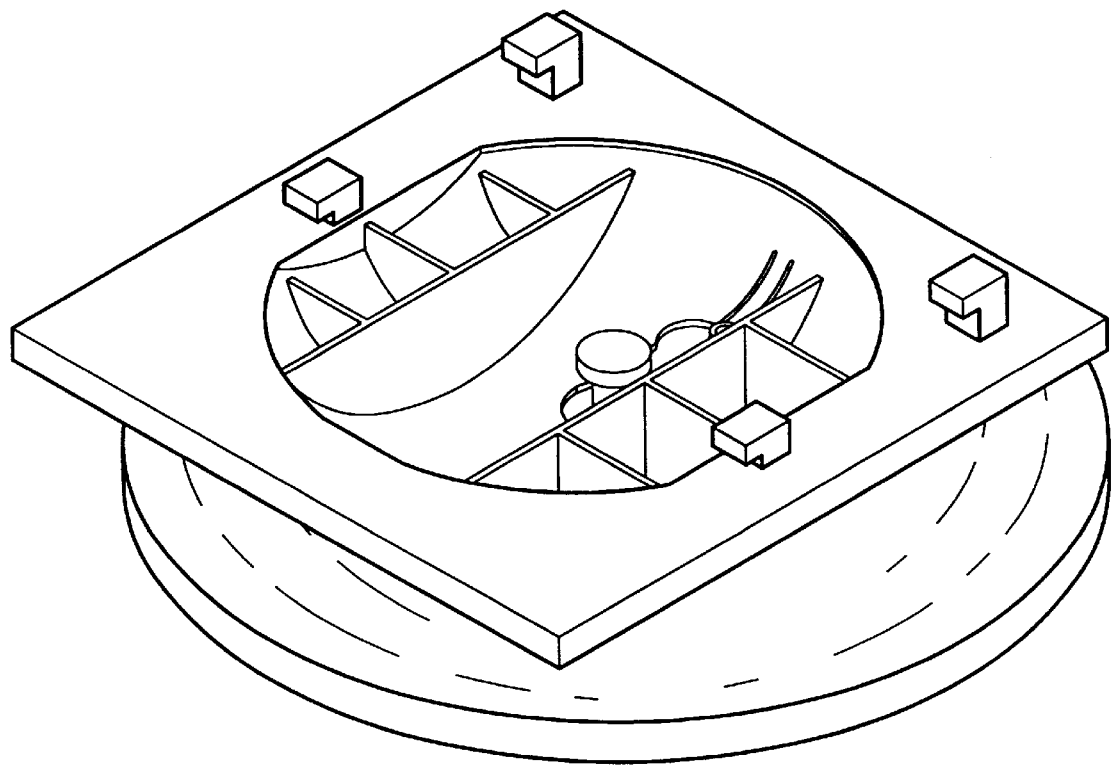
FIG. 6 is a perspective view of the monitor base according to FIG. 4.
Figure 7:
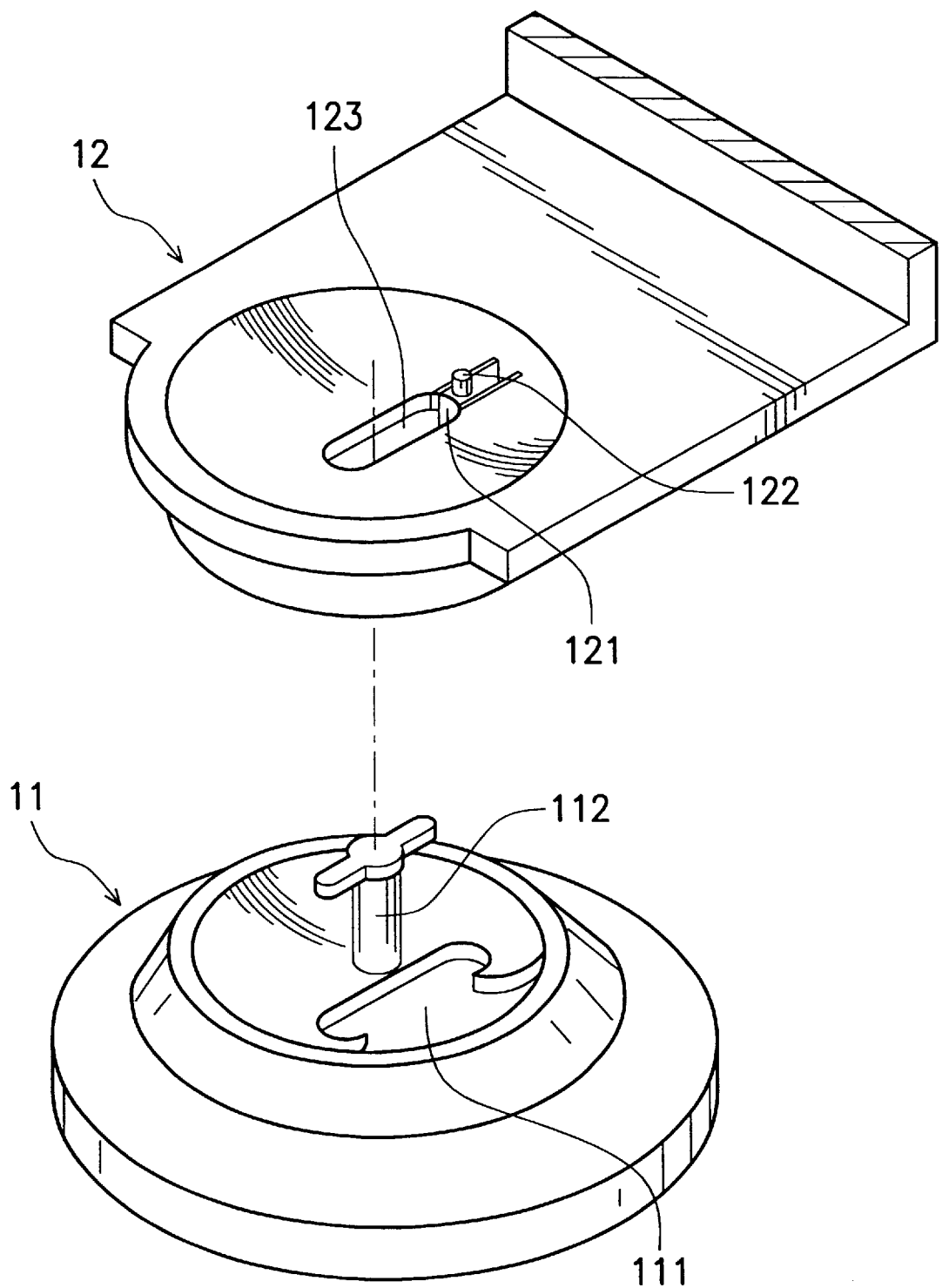
FIG. 7 is a perspective exploded view of a monitor base of the prior art.

FIGS. 4–6 show a second embodiment of the present invention. Referring to FIG. 4, a monitor base of the second embodiment includes a standing member 31 and a movable member 32. The movable member 32 is movably mounted on the standing member 31, while a monitor (not shown) is securely fixed on the movable member 32. The user can adjust the angle or position of the monitor by moving the movable member 32 with respect to the standing member 31.

The movable member 32 has a concave portion 321 around which a plurality of hooks 325 are provided to secure the monitor and the movable member 32 together. Also, an opening 322 is provided in the concave portion 321. As shown in FIG. 5, the opening 322 comprises a sliding zone 3221, a mounting zone 3222 and a resilient piece zone 3223. The mounting zone 3222 is round while the sliding zone 3221 and the resilient piece zone 3223 are slot-shaped. A cantilever resilient piece 323 extends in the resilient piece zone 3223. A guard member 324 is connected to the free end of the cantilever resilient piece 323, and occupies a part of the mounting zone 3222. Furthermore, a rib 326 is disposed on the bottom of the movable member 32 at an edge of the sliding zone 3221, as indicated by the broken line in FIG. 5.

Referring back to FIG. 4, the standing member 31 has a cavity 311 in which a coupling member 312 and four ribs 313, 314, 315, 316 are provided. The ribs 313, 314, 315, 316 radiate from the coupling member 312. The coupling member 312 comprises a support column 3122 and an end portion 3121 supported by the support column 3122. The end portion 3121 is round to match the shape of the mounting zone 3222 of the opening 322.

When assembling the monitor base, the mounting zone 3222 of the opening 322 is disposed over the coupling member 312. Then, the movable member 32 can be mounted on the standing member 31 by pressing down. In detail, the end portion 3121 of the coupling member 312 is forced to pass through the mounting zone 3222 of the opening 322 by pressing the movable member 32. The guard member 324, occupying the mounting zone 3222, is pushed away by the end portion 3121 when the end portion 3121 of the coupling member 312 passes through the mounting zone 3222. Then, the support column 3122 of the coupling member 312 enters the mounting zone 3222. Then, the end portion 3121 is pushed by the restoring force of the cantilever resilient piece 323 so that the coupling member 312 moves toward the sliding zone 3221. Then, the support column 3122 of the coupling member 312, originally in the mounting zone 3222, is moved to the sliding zone 3221. As shown in FIG. 6, the guard member 324 can prevent the coupling member 312 from returning to the mounting zone 3222 after the coupling member 312 enters the sliding zone 3221. In design, the diameter of the support column 3122 must be less than the width of the sliding zone 3221 so that the support column 3122 can enter the sliding zone 3221. Furthermore, the diameter of the end portion 3121 of the coupling member 312 must be greater than the width of the sliding zone 3221 so that the coupling member 312 cannot escape from the sliding zone 3221 of the opening 322.

The angle or position of the monitor, which is provided with the monitor base of the present invention, can be adjusted. In operation, the movable member 32 provided with the opening 322 is allowed to move with respect to the standing member 31 provided with the coupling member 312. The opening 322 of the movable member 32 can slide relative to the coupling member 312 of the standing member 31, and the sliding zone 3221 of the opening 322 itself is the space provided for sliding. This corresponds to the upward or downward rotation of the monitor. Furthermore, the opening 322 of the movable member 32 can be rotated relative to the coupling member 312 of the standing member 31, and the rib 326 of the movable member 32 is constrained by the ribs 313, 314, 315, 316 of the standing member 31 during rotation. This corresponds to the rotation of the monitor toward the left or the right (at most 45°).

The guard member 324 of the movable member 32 can be pried S away from the mounting zone 3222 of the opening 322 by, for example, a screwdriver. Then, the coupling member 312 can escape from the mounting zone 3222. The standing member 31 and the movable member 32 thus separate.

The monitor base of the present invention, like those of the prior art, comprises only two parts. However, the structure of the present invention is simpler than that of the prior art. In the present invention, the standing member has a coupling member while the movable member has an opening through which the coupling member is connected to the standing member. Also, assembling and disassembling the monitor base are controlled by a guard member provided in the opening. The design of the present invention is simple and the cost for manufacturing the monitor base is low, thereby enhancing its commercial competitiveness.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A monitor base, comprising:

a standing member having a coupling member;

a movable member having an opening through which the coupling member is movably connected to the movable member; and a guard member provided in the opening to prevent the coupling member and the movable member from separating;

the coupling member being constrained by the opening when the movable member is moved relative to the standing member.

2. A monitor base as claimed in claim 1, wherein the opening comprises a mounting zone and a sliding zone connected to the mounting zone, the guard member is provided in the mounting zone, and the coupling member of the standing member is constrained in the sliding zone.

3. A monitor base as claimed in claim 2, wherein the opening further comprises a resilient piece zone connected to the mounting zone, and the movable member further comprises a cantilever resilient piece extending in the resilient piece zone with the guard member connected to an free end of the cantilever resilient piece.

4. A monitor base as claimed in claim 3, wherein the standing member further comprises a plurality of first ribs; the movable member further comprises a second rib on its surface facing the standing member; and the second rib of the movable member is constrained by the first ribs of the standing member when the movable member is moved relative to the standing member.

5. A monitor base as claimed in claim 4, wherein the second rib of the movable member is disposed at an edge of the sliding zone.

6. A monitor base as claimed in claim 4, wherein the coupling member comprises a support column and an end portion connected to the support column; and a shape of the end portion and that of the mounting zone are matched.

7. A monitor base as claimed in claim 6, wherein the support column of the coupling member is constrained in the sliding zone.

8. A monitor base as claimed in claim 6, wherein the sliding zone of the opening and the end portion of the coupling member are slot-shaped, and a length of the end portion is greater than a width of the sliding zone.

9. A monitor base as claimed in claim 6, wherein the sliding zone of the opening is slot-shaped; the end portion of the coupling member is round; and a diameter of the coupling member is greater than a width of the sliding zone.

10. A monitor base as claimed in claim 3, wherein the sliding zone, the mounting zone and the resilient piece zone of the opening are slot-shaped; and the mounting zone is longitudinally perpendicular to the sliding zone and the cantilever resilient zone.

11. A monitor base as claimed in claim 3, wherein the mounting zone of the opening is round.

12. A monitor base comprising:

a standing member having a coupling member which comprises a support column and an end portion supported by the support column;

a movable member having an opening which comprises a mounting zone and a sliding zone connected to the mounting zone; and a resilient guard member disposed at an edge of the mounting zone and extending to the inside of the mounting zone, the resilient guard member being pushed by the end portion of the coupling member which passes through the mounting zone so that the support column enters the sliding zone to movably mount the movable member on the standing member;

the support column being constrained in the sliding zone of the opening by the guard member when the movable member is moved with respect to the standing member.

13. A monitor base, comprising:

a standing member having a coupling member which comprises a support column and an end portion supported by the support column, a diameter of the end portion being greater than that of the support column; and a movable member having a resilient guard member and an opening which comprises a sliding zone and a mounting zone connected to the sliding zone, the sliding zone being slot-shaped, a width of the sliding zone being greater than the diameter of the support column, the width of the sliding zone being less than the diameter of the end portion, the resilient guard member being provided at an edge of the mounting zone;

the guard member being pushed by the end portion of the coupling member and thus being deformed, when the coupling member is forced to pass through the mounting zone of the opening, so that an inner diameter of the mounting zone becomes greater than the diameter of the end portion so as to allow the end portion to pass through the mounting zone;

the guard member being released after the end portion passes through the mounting zone, so that the inner diameter of the mounting zone becomes less than the diameter of the end portion to prevent the end portion from escaping from the mounting zone so as to movably mount the movable member on the standing member.

* * * * *